(12) United States Patent
Niklaus

(10) Patent No.: US 6,863,464 B1
(45) Date of Patent: Mar. 8, 2005

(54) DETACHABLE ASSEMBLY OF TWO ELEMENTS

(76) Inventor: Hilmar Niklaus, Lindenweg 2, D-97654 Bastheim (DE)

( * ) Notice: Subject to any disclaimer, the term of this patent is extended or adjusted under 35 U.S.C. 154(b) by 0 days.

(21) Appl. No.: 09/868,159

(22) PCT Filed: Oct. 14, 1999

(86) PCT No.: PCT/DE99/03336

§ 371 (c)(1),
(2), (4) Date: Jun. 22, 2001

(87) PCT Pub. No.: WO00/36308

PCT Pub. Date: Jun. 22, 2000

(30) Foreign Application Priority Data

Dec. 15, 1998 (DE) .......................................... 198 57 795

(51) Int. Cl.[7] ................................................. F16B 7/18
(52) U.S. Cl. ....................... 403/341; 403/300; 403/302; 403/348; 403/350; 403/360; 403/DIG. 8; 403/DIG. 12
(58) Field of Search ................................ 403/341, 331, 403/332, 345, 348, 349, 346, 347, 286, 353, 360, 300–302, 381, DIG. 12, DIG. 8, 350; 248/224.51, 223.41

(56) References Cited

U.S. PATENT DOCUMENTS 3,851,601 A * 12/1974 Davis ..................... 403/349 X
5,119,610 A    6/1992 Birkeland et al.
5,246,303 A * 9/1993 Trilla et al. .................. 403/353
5,590,975 A * 1/1997 Horntvedt ................ 403/407.1
5,788,395 A * 8/1998 Grieser et al. .............. 403/231
5,810,505 A * 9/1998 Henriott et al. .......... 403/407.1

FOREIGN PATENT DOCUMENTS

| DE | 18 11 743 A |   | 6/1970 |
| EP | 180965 | * | 5/1985 |
| WO | 9429082 | * | 12/1994 |
| WO | 9732140 | * | 2/1997 |
| WO | WO 97/32140 A |   | 9/1997 |

* cited by examiner

*Primary Examiner*—John R. Cottingham
*Assistant Examiner*—Victor MacArthur
(74) *Attorney, Agent, or Firm*—Edwin D. Schindler

(57) ABSTRACT

The invention relates to a detachable assembly of two elements between which at least one shaft is arranged and which is secured on at least one end thereof to a holding fixture that is mounted on one of the elements. The holding fixture can be rotated, in relation to said element, around an axis that runs substantially perpendicular to the shaft. The holding fixture can be held in non-positive fit in each rotational position in relation to the shaft and/or element. The shaft (3) is secured to the holding fixture (1) and can be rotated around a distant axis that is approximately parallel to the axis of the holding fixture (1).

11 Claims, 2 Drawing Sheets

DETACHABLE ASSEMBLY OF TWO ELEMENTS

Figure 1:
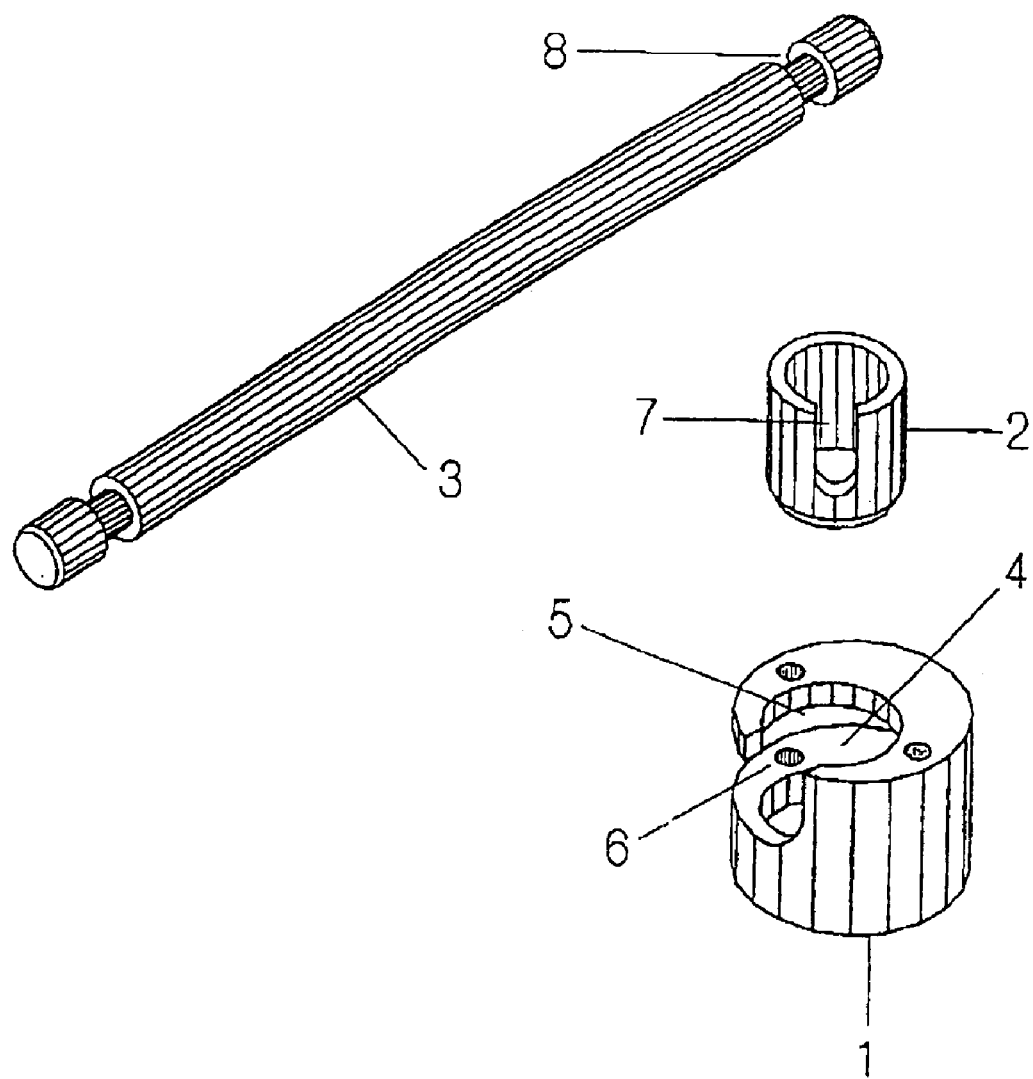

BACKGROUND OF THE INVENTION
TECHNICAL FIELD OF THE INVENTION

The invention relates to a detachable connection of two elements, between which at least one bolt is arranged and which is fixed at at least one end by means of a tensioning body attached to one of the elements, wherein the tensioning body is rotatable with respect to the element about an axis extending essentially perpendicular to the bolt, and the tensioning body is adhesionally fixed in each rotational position with respect to the bolt and/or to the element.

Such connections for joining two elements, in particular of wood are known in the most diverse embodiments and are often used in furniture for producing corner connections. The bolt connects the two elements to one another and is fixed on one side by a tensioning body, which is usually accommodated in a cavity of the furniture article. The tensioning body usually has the form of a disc, which is rotatable in a ring and to which the bolt extends in a radial direction. To produce the connection, the bolt is introduced through a slot of the ring and the disc is rotated with respect to the ring and the bolt about an axis perpendicular to the disc plane, whereby a wedge integrally moulded on the disc pushes through an eye of the bolt and pulls said eye inwards as it is rotated further in the radial direction of the disc. The radial outer edge of the wedge extends approximately in the form of a circular arc, whose centre lies on the axis of rotation, as a radial delimitation of the disc along the ring, while the radial distance of the inner wedge edge, which bears against the eye, decreases progressively further from the axis of rotation of the disc, so that the eye is drawn inwards in the radial direction. At its other end, the bolt is fastened to another element, usually a lateral furniture wall, which, by tensioning of the bolt, is tightened against the element provided with the tensioning body. Friction between the disc and ring, but also between the disc and bolt, fixes the disc in the respective position. It is disadvantageous, however, that the tensioning body only bears against the rear end of the eye and can thereby transmit only tension forces to the bolt. With such connections, the bolt must stand constantly under tension, resulting in relatively high material fatigue. In addition, if the connection is to be detached again subsequently, no pressure load can be exerted via the bolt to force the elements apart. The elements would thus have to be forced apart with other tools.

The present invention has set itself the object of providing a detachable connection between elements in which both tension and pressure forces can be transmitted between the elements via a bolt.

This object is achieved according to the invention in that the fastening of the bolt on the tensioning body is rotatable about an axis that is at a distance from the axis of the tensioning body and approximately parallel thereto.

SUMMARY OF THE INVENTION

The effect is that of an eccentric, via which the bolt is drawn or pushed in its longitudinal direction depending on the direction of rotation of the tensioning body. The maximum possible distance through which the bolt can be tensioned corresponds to twice the eccentricity.

As with the connections for furniture known from the state of the art, with the connections according to the invention, the bolt may also be fastened at its opposite end from the tensioning body to the other element. Alternatively the other end of the bolt may also be attached in the described manner to another tensioning body. Apart from the increase of the distance over which a tensioning of the bolt is possible, a tensioning force can be transmitted directly to both elements through the tensioning body attached thereto. This tensioning force would in some circumstances be partly taken up by the guide of the bolt.

As is already the case in the state of the art, with the connection according to the invention, the tensioning body can be secured against reverse rotation by friction occurring between the tensioning body and the element or else between the tensioning body and the bolt. If possible, however, the frictional force should act both through the bolt and through the element on the tensioning body, so that the fixing is more stable to loads.

By the fact that the bolts penetrates an element to a certain length, a tensioning of the articles with respect to one another is possible over a relatively long distance. The connection is thereby stable to shaking even with relatively low tensioning forces.

It is also possible that the bolt may penetrate a third element arranged between the two elements. Thereby it is possible to produce a cross connection or a post-and-crossbar connection. The first and second element may be formed by, for example, the post or the vertical crossbolt, whereas the third element is represented by the crossbar or horizontal crossbolt arranged between the aforesaid first and second elements. Alternatively it is also conceivable that the third element forms the post or vertical crossbolt.

As is known in the state of the art, the tensioning body may be fastened on an element by accommodating it in a cavity. In order that both tension and pressure forces can be transmitted to the bolt, the tensioning body must be fixed in the longitudinal direction of the bolt at both ends by the cavity.

The fastening between the bolt and tensioning body can be produced by means of constructional measures permanently attached to or integrally moulded on the bolt. By contrast-therewith, however, a retaining head detachably connected to the bolt is conceivable, which rotates with the bolt with respect to the retaining head. Since the bolt in this case need not bear any measures necessary for producing a rotatable connection, it can be shaped such that it can even be guided through narrow channels.

The retaining head can be permanently fastened on the tensioning body. Preferably, however, it is detachably connected to the tensioning body. When a repair is due it is possible only to exchange the retaining head or the tensioning body individually, and by exchanging the tensioning body a different eccentricity can be achieved with one and the same retaining head.

The bolt is preferably fixed in the retaining head by means of an axially extending slot whose flanks engage at both sides of the bolt in an azimuthally extending groove. It is conceivable that both flanks engage in the same groove, which surrounds the bolt through an angle of more than 180°, or that the bolt has two azimuthally grooves lying approximately radially opposite one another. Because of the axial alignment of the slot with respect to the tensioning body, the bolt is fixed in its longitudinal direction and, with rotation of the tensioning body, since the slot is aligned parallel to the two axes of rotation, no force component occurs in the longitudinal of the slot, through which the bolt could move along the slot and in the process detach from the retaining head. Here, it is simple to produce the connection between the bolt and retaining head by introducing the bolt into an opening of the slot. The handling of the bolt is by no means impaired by the groove.

In the ideal case, the groove of the bolt is to be embodied as a surrounding annular groove. In this case, the connection can be produced independently of the orientation of the tensioning body and retaining head relative to the longitudinal direction of the bolt.

A stable convection with a large contact area between the bolt end or retaining head and the tensioning body can be achieved by means of an extra-axial cavity accommodated in the tensioning body, in which cavity the retaining head or bolt end is to be accommodated such that it is fixed in the longitudinal direction of the bolt and can transmit both tension and pressure forces to the bolt.

In order that the tensioning body is not wedged by forces acting via the bolt, the bolt on the tensioning body should be attached, to the extent possible, centrally on the tensioning body with respect to its longitudinal direction. For this reason, the tensioning body has, for an automatic (i.e., precise or accurate) alignment, an azimuthally extending slot which the bolt penetrates. A tensioning body with this feature may be of, or provide, greater axial extension, which makes an unfavorable wedging even more difficult.

In order that, in the case of a tensioning body with azimuthally extending slot, the introduction of the bolt is simplified, the tensioning body additionally has an essentially axially extending slot, whose width, in order to allow introduction of the bolt, must be larger than the diameter or the bolt. In particular, this feature appears appropriate in combination with a slot of the retaining head, said slot extending essentially in an axial direction of the tensioning body and receiving the bolt. For introduction of the bolt, the retaining head is twisted in the tensioning body such that the two axially extending slots lie one behind the other in the radial direction. The bolt can now be introduced simultaneously both into the retaining head and into the tensioning body. After twisting of the tensioning body relative to the retaining head the bolt is fixed by the azimuthal slot of the tensioning body against a movement in the longitudinal direction of the slot produced in the retaining head.

For both the cavity of the element, in which the tensioning body is rotatably mounted and the cavity of the tensioning body in which the retaining head is rotatably mounted, the shape of a cylinder is to be preferred. But also the outer contour of the tensioning body or retaining head is preferably formed in this shape in order that, in the case of a relatively large contact surface between the cavity of the element and the tensioning body or between a cavity of the tensioning body and the retaining head, the effect of the eccentric can be achieved. All the contours mentioned in this context are in the ideal case cylindrical.

Preferably a cavity of the element or of the tensioning body should be designed open at one axial side in order that it is accessible for introduction of the tensioning body or for producing the connection, and any repair work subsequently becoming due can be performed more easily.

The external appearance however is more appealing than in the case of locked cavities. In addition, by closure of a cavity it is achieved that the tensioning body or retaining head cannot become detached in an undesirable manner. It is also conceivable to combine the advantages of a closed cavity with those of an open cavity by forming the cavity open at one side and closed at the other side.

Figure 2:
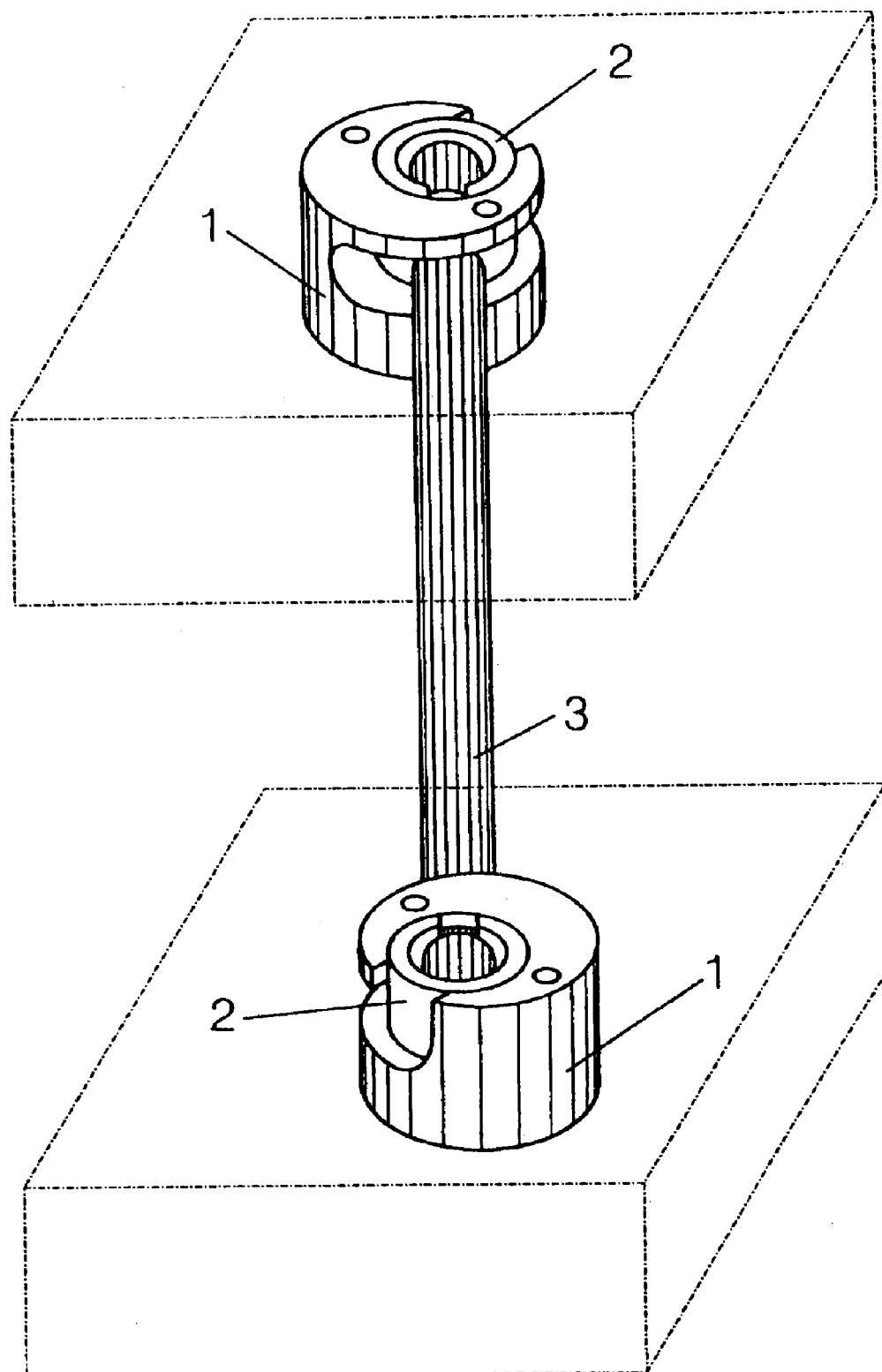

Other details, features and advantages of the invention can be derived from the following descriptive part, which describes a typical embodiment of the invention with the aid of drawings, wherein, in diagrammatic view FIG. 1 shows the individual parts of the connection according to the invention, and FIG. 2 shows the individual parts in assembled form.

BRIEF DESCRIPTION OF THE DRAWING FIGURES

FIG. 1 shows the connection according to the invention in perspective exploded view. It is formed by a bolt (3), which is fastened in a tensioning body (1) by means of a retaining head (2). The tensioning body (1) contains, offset with respect to its axis of rotation, a cylindrical cavity (4) to receive the retaining head (2) and therewith the bolt (3), as well as an azimuthal slot (5), through which the bolt (3) is guided outwards from the cavity (4), and an axial slot (6) for introduction of the bolt (3) on production of the connection. The retaining head (2) has the form of a hollow cylinder whose diameter is slightly smaller than the cavity (4) accommodated in the tensioning body (1) and has an axial slot (7) for receiving the bolt (3), which for its part is provided, in the vicinity of the end facing the tensioning body (19), with a groove (B), shown here as a surrounding annual groove, extending azimuthally with respect to the bolt (3), which groove is received to produce the connection from the axial slot (7) of the retaining head (2). As a result of the formation of the azimuthal groove (8) of the bolt (3) as surrounding annual groove, the connection can be made for any rotation angle of the bolt (3) about its axis.

At its other end, the bolt (3) also has a surrounding annual groove and can there be fixed on a further element or attached via a detachable connection similar to the way described. There are two possibilities for introducing the bolt (3) into the tensioning body (1): One consists in first introducing the retaining head (2) into the cavity (4) of the tensioning body (1) such that the axes of the retaining head (2) and cavity (4) become congruous and then twisting the retaining head (2) and tensioning body (1) with respect to one another about the axis of the cavity (4) or retaining head (2) such that the axial slot (7) of the retaining head (2) is aligned in an approximately radial direction behind the axial slot (6) of the tensioning body (1). Now the bolt (3) is introduced in the axial direction of the tensioning body (1) or retaining head (2) into the two axial slots (6 and 7, respectively) such that its groove (8) is received by the axial slot (7) of the retaining head (2). After the tensioning body (1) is twisted about its axis with respect to the retaining head (2), the bolt (3) penetrates the azimuthal slot (5) of the tensioning body (1). The other possibility consists in first introducing the bolt (3) via the groove (8) into the slot (7) of the retaining head (2) via the axial slot (6) into the tensioning body. After the tensioning body (1) has been twisted about its axis, the same result is obtained.

FIG. 2 shows tensioning body (1), retaining head (2) and bolt (3) assembled in perspective view. In one axial direction, the retaining head is now fixed, because the cavity (4) of the tensioning body (1) there is closed in the other axial direction by the bolt (3), which for its part is fixed in the axial direction of the tensioning body by virtue of its azimuthal slot (5). The tensioning body (1) is in turn accommodated in an approximately cylindrical cavity of the element, whose cylinder diameter is slightly greater than that of the tensioning body (1). For transmitting tension or pressure forces (1) to the bolt (3), the tensioning body (1) is twisted in the cavity of the element, as a result of which the axis of rotation of the retaining head (2), by virtue of the fact that it is accommodated in an eccentrically arranged cavity (4) of the retaining head (2), describes a circular arc. The rotation of the tensioning body (1) compensates the retaining head (2) by a contra-rotation about its axis of symmetry, and in the process, depending on the direction of rotation, transmits tension or pressure forces to the bolt (3). If the mutually contacting surfaces of the elements, of the tensioning body (1) and of the retaining head (2) are not too smooth, the tensioning body (1) is fixed in any rotational position by friction with the element or with the retaining head (2).

FIG. 2 further illustrates two elements (shown in phantom) detachably connected to one another, in accordance with the present invention, via a bolt arranged therebetween.

Overall, a detachable connection between two elements is obtained, by means of which, by means of a tensioning body (1) via a bolt (3), both tension and pressure forces can be transmitted.

What is claimed is:

1. A detachable connection of two elements, comprising:

an attachment rod consisting of only one bolt;

two elements detachably connected to one another via said one bolt;

a tensioning body having an azimuthally extending slot through which said one bolt is penetratable for fixing said one bolt at one end to one element of the two elements, said tensioning body being rotatable relative to said one element about an axis extending substantially perpendicular to said one bolt with said tensioning body being connected in any rotational position relative to said one bolt; and, means for fastening said one bolt to said tensioning body, said means for fastening being rotatable about an axis that is distanced from a substantially central axis of said tensioning body and substantially parallel thereto, said means for fastening including a retaining head detachably attached to said one bolt and being rotatable relative to said tensioning body, said retaining head being eccentrically located within said tensioning body for tensioning said one bolt in an axial direction with rotational movement of said tensioning body compensating said retaining head via a contra-rotational movement, thereby transmitting tension to said one bolt for said fixing of said one bolt.

2. The detachable connection of two elements according to claim 1, wherein said one end is a first end and said one bolt has a second end opposite said one end with said second end of said one bolt being fastened to one element of said two elements.

3. The detachable connection of two elements according to claim 1, wherein said one end is a first end and said one bolt has a second end opposite said first end with said one bolt being fixed at said second end of said one bolt via an additional tensioning body to a second element of said two elements, said additional tensioning body being rotatable relative to said second element about an axis extending substantially perpendicular to said one bolt, and further comprising additional means for fastening said additional tensioning body to said one bolt, said additional means for fastening being rotatable about an axis distanced from an axis of said additional tensioning body and substantially parallel thereto, said additional tensioning body being connected in any rotational position relative to said one bolt.

4. The detachable connection of two elements according to claim 1, wherein said one bolt penetrates at least one of said two elements.

5. The detachable connection of two elements according to claim 1, wherein said tensioning body is accommodated in said one element of said two elements connecting said tensioning body.

6. The detachable connection of two elements according to claim 1, wherein said retaining head is detachably connected to said tensioning body.

7. The detachable connection of two elements according to claim 1, wherein said tensioning body is of a substantially cylindrical shape.

8. The detachable connection of two elements according to claim 1, wherein said retaining head is of a substantially cylindrical shape.

9. The detachable connection of two elements according to claim 1, wherein said one element of said two elements is open on an axial end face.

10. The detachable connection of two elements according to claim 1, wherein a cavity of said tensioning body is open on an axial end face.

11. The detachable connection of two elements according to claim 1, wherein said one element of said two elements is closed on an axial end face.

* * * * *